United States Patent
Peters et al.

(10) Patent No.: US 6,391,361 B1
(45) Date of Patent: May 21, 2002

(54) PRODUCTION OF PROTEIN-CONTAINING POWDERY PRODUCT

(75) Inventors: Lars Valentin Peters, Charlottenlund; Ole Teglhus Kragh, Hornbaek, both of (DK)

(73) Assignee: APV Nordic Anhydro A/S, Soborg (DK)

(*) Notice: Subject to any disclaimer, the term of this patent is extended or adjusted under 35 U.S.C. 154(b) by 0 days.

(21) Appl. No.: 09/667,589

(22) Filed: Sep. 22, 2000

(30) Foreign Application Priority Data

Sep. 22, 1999 (DK) .......................... 1999 01349

(51) Int. Cl.⁷ ................................. A23C 1/00
(52) U.S. Cl. .................. 426/471; 159/45; 159/47.1; 426/491
(58) Field of Search ................. 426/465, 471, 426/491; 159/2.1, 45, 47.1

(56) References Cited

U.S. PATENT DOCUMENTS

| | | | |
|---|---|---|---|
| 3,537,860 A | 11/1970 | Moore et al. | 426/471 |
| 3,615,663 A | 10/1971 | Becker | 426/471 |
| 3,956,521 A | 5/1976 | Pisecky et al. | 426/471 |
| 4,267,015 A | * 5/1981 | Ciboit et al. | 159/47.1 |
| 4,441,958 A | 4/1984 | Teucci | 159/46 |
| 4,921,717 A | 5/1990 | Ranjith | 426/492 |
| 5,006,204 A | 4/1991 | Jensen | 159/45 |
| 5,730,836 A | 3/1998 | Greig et al. | 159/47.1 |

FOREIGN PATENT DOCUMENTS

| | | |
|---|---|---|
| EP | 0042605 | 12/1981 |
| EP | 2535171 | 5/1984 |
| EP | 0141403 | 5/1985 |
| EP | 0205601 | 12/1986 |
| GB | 2115302 | 9/1983 |
| GB | 2255703 | 11/1992 |
| WO | WO8603942 | 7/1986 |
| WO | WO9735486 | 10/1997 |

OTHER PUBLICATIONS

K. Masters, "Spray Drying Handbook", 1972 pp. 596–597.
Dr. R. Perez et al., "Aroma Recovery and Sulfur Dioxide Preservation of Orange Juice", XP–000956358, 1980, vol. 25 (1980), pp. 132–140.
Kimura Kakoki, JP–A–58–216701, Dec. 16, 1983, abstract only.
LIOY, XP–002129636, 1998, abstract only.
XP–000957407, "Whey finishing system increases dryer capacity 50%", Food Engineering, Dec. 1983.

* cited by examiner

*Primary Examiner*—George C. Yeung
(74) *Attorney, Agent, or Firm*—Birch, Stewart, Kolasch & Birch, LLP

(57) ABSTRACT

A method is provided for producing a powdery product from a protein-containing liquid having a dry solid content, providing (1) a first feeding stream of protein-containing liquid, (2) a second feeding stream having a higher content of dry solids than the first feeding stream, (3) mixing the first feeding stream and second feeding stream to obtain a main stream, (4) heating the main stream in a heater, (5) transferring the heated main stream to a separator, (6) flash separating volatile components from the heated main stream and obtaining a main stream protein-containing concentrate, and subjecting at least a part of the main stream protein-containing concentrate to a drying step to obtain a powdery product. The amount of water to be evaporated in the drying step is significantly reduced, requiring smaller drying equipment, less air and less energy, and yields a powdery product having higher "bulk density".

26 Claims, 2 Drawing Sheets

PRODUCTION OF PROTEIN-CONTAINING POWDERY PRODUCT

The present invention relates to a method for drying of a protein-containing liquid, such as milk and milk-derived liquids for the manufacture of a powdery product.

Furthermore, the present invention relates to a system for drying a protein-containing liquid, such as milk and milk derived liquids, which due to heat sensitivity or formation of sticky or hygroscopic substances may be difficult to convert into a powder of high quality, such as a free-flowing, non-caking powdery product.

Yet furthermore, the present invention relates to a system for drying of milk and milk derived liquids in a process which is more energy efficient than the prior processes implemented by industry and at the same time provides an apparatus requiring lesser building volume than the previous apparatuses.

BACKGROUND

Milk powders are defined as follows:

Dehydrated products based on non-fat milk solids and milk fat, that is natural milk in which the fat content may be standardised by centrifugation or addition of cream to achieve the fat content required in the final product, between 0.5 and 30%, expressed on total solids.

Further the protein content of the milk may be standardised by means of addition of lactose or permeate in case the protein content in the milk supply is too high. These products are termed skim milk and whole milk powders, defined as milk powder with max 1% fat and 26% fat respectively. Fat filled milk powders are based on skim milk and vegetable or animal fat with a fat content of 10–80%.

Further, the milk powders may contain functional additives, such as emulsifiers stabilisers and flavouring and colouring agents.

Milk powders are used for various purposes such as ingredients in human and animal consumption.

PRIOR ART

In prior art several processes are known for manufacture of free-flowing, non-caking powdery milk products. In these known state-of-the-art processes milk is initially concentrated as much as possible, such as in a multiple effect falling film tubular evaporator. Thereby a concentration up to approx. 50% total solids (TS) is obtained.

This liquid product with approx. 50% total solids may then be spray and/or fluid bed dried and cooled in a fluid bed. (Masters, Spray Drying Handbook, 4 ed. 1985, Chapter 15.1, p. 575ff)

The mentioned prior art process is widely used in industry. It has, however several drawbacks.

First, the energy efficient multiple effect evaporation process can only be used to concentrate the whey to approx. 50% TS while the rest of the water removal requires a less energy-efficient air dryer. The limit of approx. 50% TS in prior art evaporators is set by the viscosity of the milk concentrate. Attempts to produce concentrates with higher total solids lead to un-pumpable products and formation of deposits which may promote growth of bacteria.

Therefore, since long the milk powder industry has an unfulfilled demand for a process for drying of protein-containing, such as milk and milk derived liquids for the manufacture of a powdery product substantially free-flowing, non-caking, and which process is more energy efficient than the prior art processes implemented by industry and at the same time provides an apparatus requiring lesser building volume than the previous apparatuses.

SUMMARY OF THE INVENTION

Accordingly, the present invention relates to a method and a system for producing a powdery product from a protein-containing liquid having a dry solid content comprising the steps of providing a first feeding stream of the protein-containing liquid, providing a second feeding stream having a higher content of dry solids than said first feeding stream, mixing said first feeding stream and said second feeding stream obtaining a main stream, heating the main stream in a heater, transferring the heated main stream to a separator, flash separating volatile components from said heated main stream obtaining a main stream protein-containing concentrate, and subjecting at least a part of the main stream protein-containing concentrate to a drying step obtaining a powdery product.

By the term "powdery product" is meant a product normally considered as powder, i.e. having a particle size corresponding to powder, such as preferably above 0.1 μm and preferably below 2 mm, the particle size being measured as the approximate diameter of the particle.

Also the invention relates to a system for drying protein-containing liquids in a process which is more energy efficient than prior processes in that:

the amount of water to be evaporated in the drying step is significantly reduced, requiring smaller drying equipment, less air and less energy, the total thermal degradation of particles is strongly reduced a powdery product having higher "bulk density" is obtainable

DRAWINGS

DETAILED DESCRIPTION OF THE INVENTION

Figure 1:
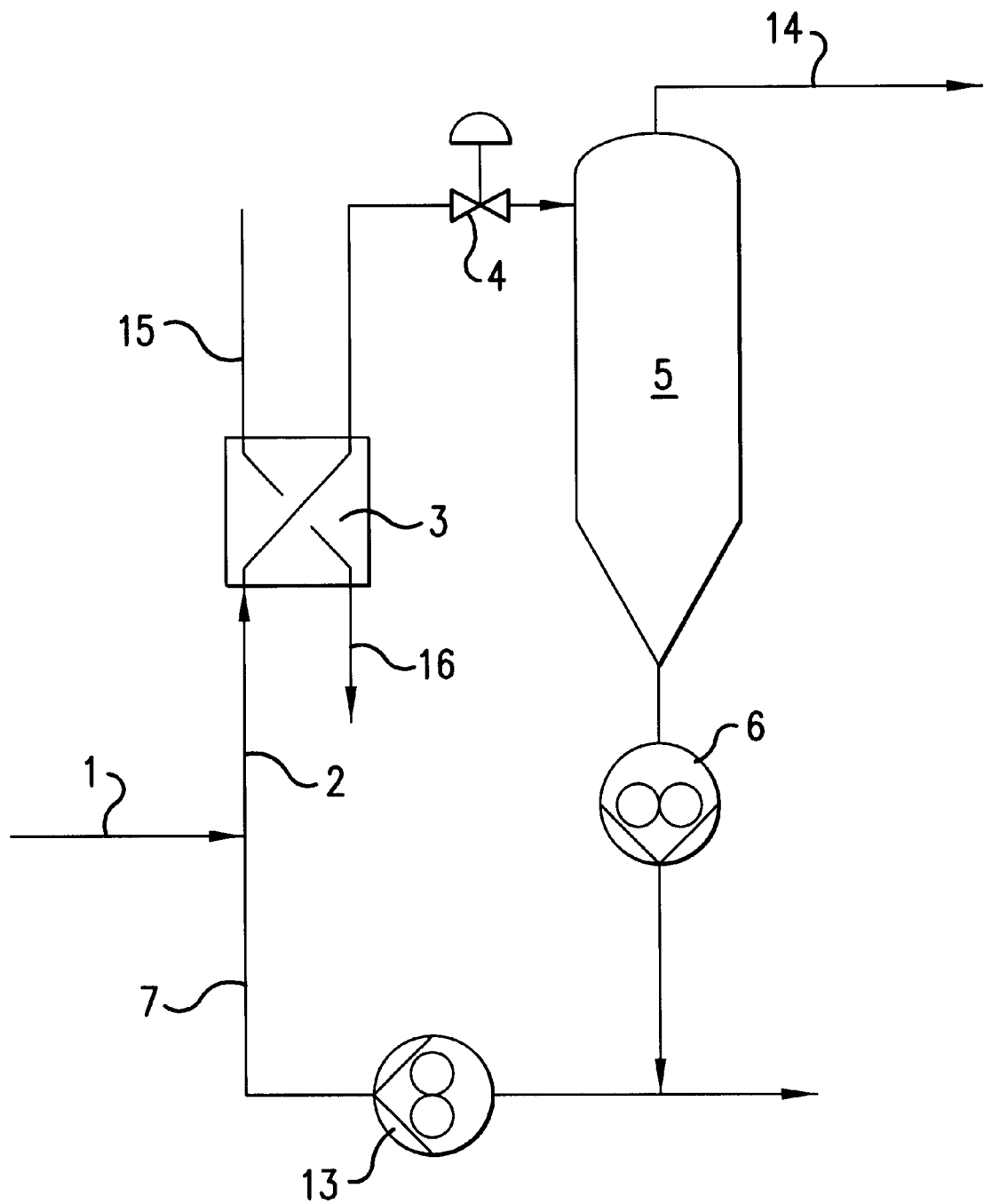
FIG. 1 is a schematic diagram of an evaporation unit of a system according to the invention for carrying out the method.

It is an object of the present invention to obtain a concentrate having a higher content of dry solids than prior art products before subjecting the concentrate to a drying step.

Another object is to dry the concentrate to a powdery product in an energy-efficient manner. The drying step is preferably carried out in a spin flash dryer, such as the Spin Flash™ dryer from APV Anhydro. Spin flash drying is also described in for example EP 0 141 403 and EP 0 862 718, both to APV Anhydro. Thereby the particle size of the powdery product may be controlled. Furthermore, by using a Spin Flash dryer the drying temperatures used may be so low, that the powdery product does not need any cooling after drying. However, the drying step my be carried out in other suitable drying means, such as a fluid bed or an attrition dryer. In particular when drying a concentrate having a high fat content a fluid bed may be preferred.

The highly concentrated protein-containing concentrate is obtained by providing a first stream of the protein-containing liquid to be concentrated and mixing said first feeding stream with a second feeding stream having a higher content of dry solids than said first feeding stream, obtaining a main stream.

The mixing of the two streams is preferably carried out by leading one stream into the other, such as leading the first feeding stream into the second feeding stream. However, the mixing may also be provided for by leading each feeding stream to a heater separately allowing the mixing to take place in the heater. This of course depends on specific heater.

Preferably a major part of the main stream is constituted by the supply from the second feeding stream, so that the ratio of the first feeding stream rate to the second feeding stream rate as measured in kg/hour is below 1, such as at most 1:20, more preferably at most 1:40, most preferably 1:100. It is believed that smaller ratios lead to more gentle concentration processes.

The content of dry solids in the second feeding stream is higher than the content of dry solids in the first feeding stream, so that the dry solid content is preferably at least 2% higher in the second feeding stream, more preferably at least 5% higher, such as at least 10% higher, more preferably at least 15% higher.

The composition of dry solid ingredients of the first feeding stream and the second feeding stream are preferably substantially identical, although the invention may be carried out by using a second feeding stream having a composition of dry solid content different from said first feeding stream.

In a preferred embodiment at least a part of the main stream protein-containing concentrate is recycled to the second feeding stream, more preferably the main stream concentrate is divided into a recycling stream and a drying stream whereby the recycling stream is used as the second feeding stream.

The recirculation is preferably carried out by continuous recirculation of a predetermined partial flow of the main stream concentrate.

The predetermined partial flow preferably corresponds to a recycling stream comprising at least 80% of the dry solids of the main stream protein-containing concentrate, more preferably comprising at least 85% of the dry solids.

The main stream obtained by mixing the first feeding stream and second feeding stream is heated in a suitable heater.

The heater used may be any suitable heater providing a homogenous heating throughout the liquid. An example of a suitable heater is a heat exchanger, such as a plate heat exchanger.

Another heating means is an electro-heating means providing volumetric heating by means of direct electrical resistance heating.

The protein-containing liquid is heated up to a temperature below the coagulation temperature of the proteins of the liquid, the coagulation temperature being defined as the temperature, which—under the conditions present and the particular protein-containing liquid—will cause undesired, irreversible changes in the molecular structure of the proteins. Normally the protein-containing liquid is heated to a temperature from 300° C. to 65° C., in some embodiments the temperature is preferably from 350° C. to 40° C.

Boiling is not allowed to take place within the heater itself, Boiling is suppressed either by a liquid static head above the heater or by a restriction in the discharge line in the form of an orifice piece or a control valve.

After being heated the protein-containing liquid is transferred to the separator vessel by means of for example a connecting line between the heater and the separator vessel, to be flash separated in the separator. The principle of flash evaporation according to this invention is well known, see e.g. Perry's Chemical Engineer' Handbook, 6. Ed (1984), p.11–35, 11–40. A flow of liquid is heated in a heater and allowed to expand into a vessel where the actual solvent (volatile components) will evaporate with a corresponding drop of temperature in the liquid phase. It is understood that the temperature rise in the heater and the temperature drop of the liquid in the flash are substantially equal.

The volatile components will be any components, normally water in the liquid product capable of evaporation at the temperature and pressure of the separator vessel. During flash separation the volatile components of the liquid products are separated from the liquid product, whereby a liquid concentrate of the liquid product is obtained. After separation the formed vapour is removed by means of a condenser or vacuum pump.

The temperature of the separator vessel is equal to or a few degrees below the temperature of the heated liquid product. Accordingly, the temperature of the liquid product in the separator vessel is preferably in the range of 25–95° C., more preferably in the range of 30–60° C., such as from 30° C. to 35° C.

Furthermore, the pressure in the vessel wherein the flash separation is carried out is preferably regulated to a pressure below the vapour pressure of the heated liquid product. Thus, the separation is preferably conducted under a pressure in the range of 0.05–0.9 bar. More preferred a high vacuum is applied, such as 0.1–0.3 bar.

It is an aim of the present method to concentrate the liquid to a high content of dry solids before the drying step. Thus, the protein-containing concentrate obtained after flash-separation preferably comprises at least 50% of dry solids. The concentration method is preferably applied in the production of milk powder, whereby it is desired to obtain as large a solid concentration as possible during concentration in order to improve the subsequent drying process. In a preferred embodiment the main stream protein-containing concentrate obtained comprises at least 60% of dry solids, and in a more preferred embodiment at least 70% of dry solids.

The protein-containing liquid being the starting material for the method may be any liquid containing protein being desirable for powder production. The protein-containing liquid is preferably comprising at 3% dry protein solids. In case the starting material comprises lactose, it is preferred, in order to avoid lactose crystallisation during the concentration process, that the lactose content of the protein-containing liquid is preferably at most 75% of dry solids, such as at most 65% of dry solids, such as at most 55% of dry solids.

The method is also suitable for concentrating a fat-containing liquid, such as protein-containing liquid wherein the fat content is at least 0.5% of dry solids.

Preferably the starting material comprises at least 20% of total dry solids, preferably at least 30% of dry solids, more preferably at least 40% of dry solids. In the present content the term dry solids is used to mean total solids. Total solid "TS" in a product or an intermediate as kg dry solid/kg product, as measured by weight loss in oven at 102° C., 4 hours. An example hereof are milk and milk derived liquids, such as skimmed milk, whole milk, butter milk, milk protein concentrate, cream, butter, malted milk, Na-caseinate and Ca-caseinate, and delactosed whey.

Examples of vegetable protein-containing liquids are, vegetable proteins, vegetable protein isolates, soy proteins, and coconut milk.

Yet other protein containing liquids are egg, egg white, blood and shortening.

Various pre-treatment of the starting material before entering the first feeding stream to the heater may be carried out. Also, a pre-concentration step may be conducted. In particular with respect to milk a pre-concentration may be conducted whereby the solid content is increased from the starting concentration to about 50%. The pre-concentration may be carried out by any suitable method known to the skilled person, such as a falling-film method.

In order to obtain a powdery product from the concentrate, at least a part of the main stream protein-contained concentrate obtained is subjected to a subsequent drying step obtaining a protein-containing powdery product.

In case of recirculation the main stream concentrate is normally divided into a recycling stream and a drying stream, said drying stream being subjected to the drying step as described above. In a preferred embodiment the drying stream is led to a buffer tank, preferably having agitating means, before entering the drying means. If appropriate the drying stream may be cooled prior to the drying step.

Highly concentrated protein-containing concentrate may be very viscous, however due to a possible visco-elastic and thixotropic nature of the concentrate, the circulation rate has a great influence on the viscosity of the concentrate. The circulation rate is controlled to any suitable rate with respect to the apparatus in use. The rate is preferably as high as possible reducing the viscosity of the liquid concentrate.

The method has been described with respect to one evaporation unit comprising a heater and a flash separator. However, the method may also be conducted in a system comprising two or more units. Thereby, the concentration of the liquid concentrate solids is increased stepwise. For example with respect to milk, the concentration of the liquid concentrate from the first unit may be 62%, and from the second unit 68% starting with 50% in the liquid. For each unit recirculation of the liquid concentrate may take place as described above. A more energy-efficient concentration process is obtained when the concentration is carried out stepwise.

In a preferred embodiment the system comprises two units whereby at least a part of the main stream protein-containing concentrate is a feeding stream to be subjected to a second heating step in a second heater, and a second separating step obtaining a second main stream protein-containing concentrate. At least a part of the thus obtained concentrate may then be subjected to the drying step.

By the present method it has become possible to concentrate liquid products, in particular milk products, to a higher concentration than previously possible before subjecting the product to a drying step, whereby it has become possible to obtain a free-flowing, non-caking powdery product having a higher bulk density than by known processes. The powder flowability may be measured according to Cheremisinoff (se below) whereby a free-flowing powdery product is having an angle of repose of 30 or less. The caking properties are estimated by examining the crust formed on a spoonful of powder, subjected to 60 and 80% respective humidity at 20° C. for 24 hours.

The less the powdery product is caking the more stable a product is obtained. Without being bound by theory it is believed that the favourable powder properties are due to the efficient concentration process leading to a more gentle drying process than previously obtainable.

Furthermore, a powdery product having a higher bulk density than previously obtainable, is produced by the present method. The increase in bulk density leads to a decrease in cost for packaging, storage and transport of the powder obtained. Also, with respect to a fat-containing powder, it is possible to obtain a large portion of the fat as free fat which is especially desirable when producing milk powder for the chocolate industry.

Examples of the powdery product obtainable by the present method are skimmed milk powder (fat content 1%), whole milk powder (fat content 26%), butter milk powder, baby food mix, milk protein concentrate powder, Na-caseinate powder, Ca-caseinate powder, vegetable protein powder, delactosed whey protein powder, cream powder, butter powder, shortening powder, soy milk powder, coconut milk powder, egg powder, egg white powder and malted milk powder.

Depending on the nature of the protein-containing liquid it maybe appropriate to add various additives before the dying step. Accordingly, in one embodiment of the invention at least a part of the main stream protein-containing concentrate is mixed with a secondary stream before being subjected to the drying step. The secondary stream may comprise any suitable additive to the powdery product, such as vitamins, proteins, fats and/or carbohydrates.

Another purpose of providing the secondary stream is to increase the concentration of total solids before drying, For many uses, such as baby food, it will be convenient to feed additional nutritional material to the main stream in order to obtain a free flowing, non-caking powder suitable as baby mix.

Accordingly, the secondary stream may comprise fats, proteins, carbohydrates, vitamins, minerals or mixtures of these.

Examples of fats are animal or vegetable fats, such as lard, butter, butter fat, coconut oil, palm kernel oil.

Examples of proteins are animal and vegetable proteins, such as proteins from milk, proteins from egg, soy proteins, whey protein concentrate, wheat proteins. In particular in the production of skimmed milk powder it is suitable to add wheat proteins.

Examples of carbohydrates are lactose, starches, flour, sugars, dextrose, in the production of coffee whitener lactose may be added. Examples of minerals are salts of calcium, sodium and potassium.

Normally a mixture of the above would be used, such as skimmed milk powder, whole milk powder and whey protein concentrates.

In one embodiment of the present invention the secondary stream is obtained by withdrawing a secondary stream of finally dried powdery product and recycling said secondary stream of powdery product to be mixed with the main stream of protein-containing concentrate passing to the drying step.

The secondary stream may be withdrawn at any stage after the final drying. It is preferred to withdraw the secondary stream from the main stream of finally dried free-flowing, non-caking powder.

In one embodiment of the present invention, the secondary stream is fed to the buffer tank, wherein a continuous mixing operation is being performed to provide agitation and residence time, to change the properties of the product emerging from the mixing means.

To adjust the content of total solids in the main stream before the stage of the mixing means within a specified range, the content of total solids in the main stream after the initial cooling may be measured. An example of measurement may be withdrawal from the main stream immediately after the mixing means of a sample, and obtaining a measure of the content of total solids in the sample.

The result from the measurement may be used to adjust the flow of the secondary stream to obtain the specified content of total solids before the stage of the mixing means. The adjustment of the secondary streams may be carried out manually or by an automatic process.

Another example of measurement is where a sample is withdrawn immediately before the stage of the mixing means and the other steps are performed as described above.

A detailed description of the system according to the invention is provided by reference to the drawings.

Turning to FIG. 1 a preferred system comprising an evaporation unit for concentrating protein-containing liquid is shown. The liquid is fed to the system via the conduit (1) to main conduit (2). The main conduit (2) is leading to the heat exchanger (3), wherein the liquid product is heated up to a temperature below the coagulation temperature of the liquid product. The heat exchanger (3) is preferably a plate heat exchanger. The heat exchanger (3) is heated by steam or hot water that is led to the heat exchanger (3) through conduit (15) and out through conduit (16). Boiling in the heat exchanger is suppressed by a control valve (4).

The liquid is transferred in the conduit to the separator vessel (5). Flash separation is carried out in the separating vessel (5), whereby the vapour is removed by conduit (14) and the recirculation stream concentrate obtained is removed by a conduit through positive displacement pump (6). In the preferred embodiment the concentrate obtained is divided into a drying stream flowing in conduit (8) (vide FIG. 2) and a recirculation stream flowing in conduit (7) through positive displacement pump (13). The recirculation stream in conduit (7) is mixed with liquid from conduit (1) and recycled to the heat exchanger (3) through conduit (2).

As may be understood from the above the invention also encompasses a system comprising at least two evaporation units, whereby the units are connected in series.

Figure 2:
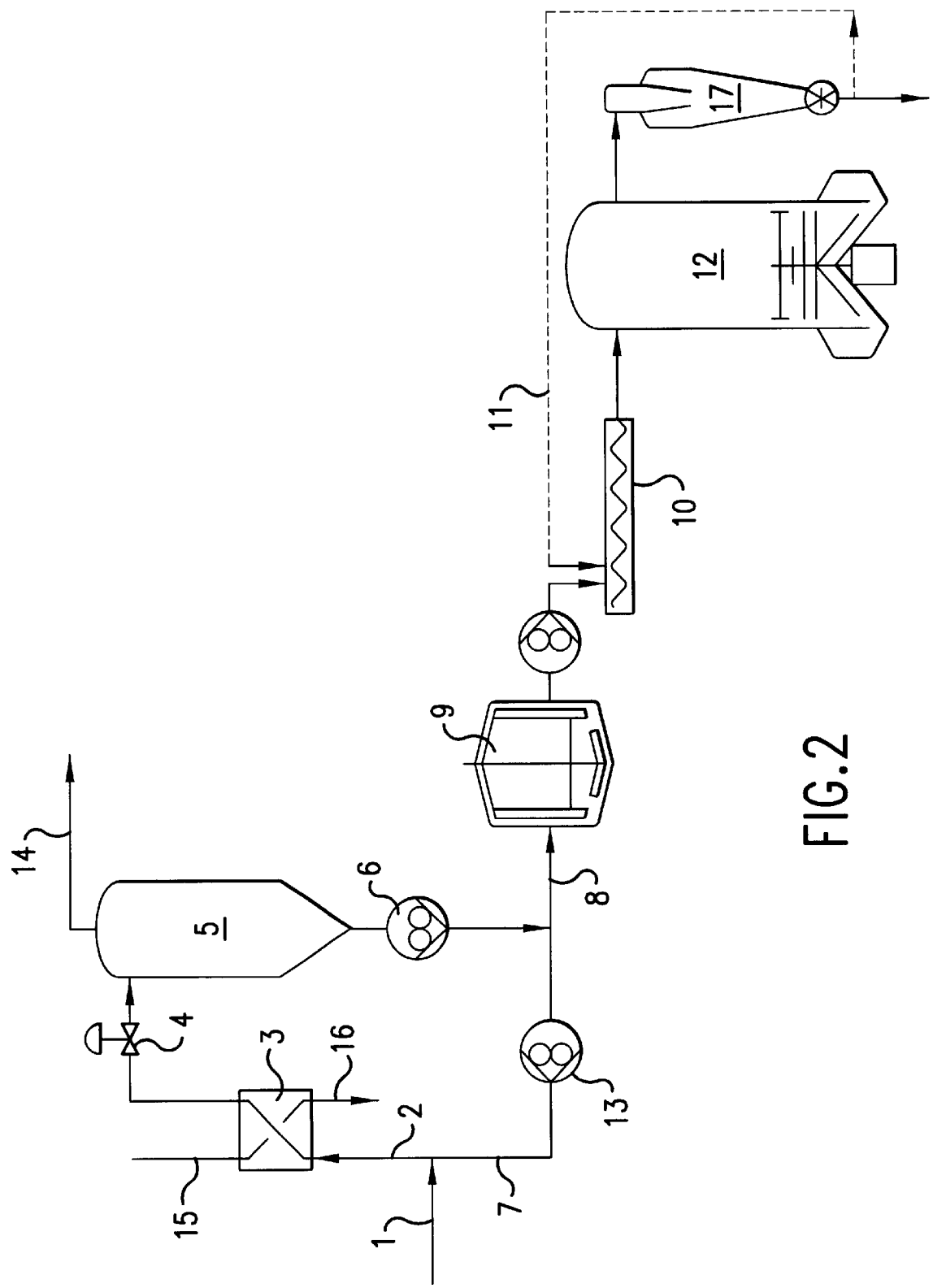
FIG. 2 shows the unit of FIG. 1 connected to a drying unit according to the invention.

FIG. 2 shows a system according to the invention for drying the concentrate obtained by a system as depicted in FIG. 1. Conduit (8) is leading concentrate to a buffer tank (9). The buffer tank (9) may be any suitable vessel comprising agitation. Optionally cooling may take place in the buffer tank.

The concentrate is then transferred to a feeding means (10) for a drying apparatus (12). The feeding means (10) may be any suitable feeding means for residence and transport of the concentrate. The feeding means (10) may comprise a screw and/or a conveyor belt. The dryer (12) is preferably a spin flash dryer.

In a preferred embodiment the system comprises a secondary conduit (11) extending to the main conduit part leading to the feeding means (10). As may be seen from FIG. 2 the secondary conduit (11) may be a conduit extending in a closed loop connection from a part of the main conduit conveying finally dried product to the main conduit part leading to the feeding means (10).

EXAMPLES

The invention and the advantages obtained are elucidated by the results from the following experiment 1 (comparison) and experiment 2 (according to the invention).

The feed material for Experiment 1 and 2 was skimmed milk pre-concentrated in a MVR falling film evaporator with 50 mm tubes of 18 m length as described by e.g. Knipschildt In Modern Dairy Technology (Ed. Robinson), 2. Ed., 1986 vol. 1, p. 147 ff.

Experiment 1 was conducted according to prior art whereby the pre-concentrated skimmed milk was dried by spray drying in a 3-stage dryer with a chamber of a diameter of 5 m. and a total height of 12 m. with internal and external fluid beds and fitted with an air broom.

Experiment 2 was performed according to the invention in a system as the one illustrated in the drawings. The concentrate from the falling film evaporator (not shown in the drawings) was fed to the recirculation line (7) of a suppressed boiling forced circulation plate evaporator (3,4,5,6,7). After heating the separation process took place in a flash separator (a Single effect Paraflash, manufactured by APV Separation Processes). The concentrate from the exit line (8) was held in a buffer tank (9) for 15 min. It was then led to the inlet of a mixer/feeder (10) together with dry powder (backmix, (11)) and fed directly to an air dryer (12) (Spin Flash™ Dryer, manufactured by APV Anhydro).

Measurement of particle size was made by laser diffraction: The powders were distributed on a small vibrating powder-feeder, suspended in air and blown/sucked through the laser beam of a Malvern Particle Sizer Series 2600.

Particle size measurements are expressed as Rosin-Rammler-Bennett (RRB) mean diameter d' and as RRB inclination parameter, n (See e.g. DIN Standard 66145 or many textbooks, including Perry's Chemical Engineers' Handbook, 6.th edition (1984) p. 8–5).

Flowability of a powder was measured by pouring app. 10 grams of powder in a wide tipped funnel, resting on a table. When the funnel is removed carefully by hand, the powder will be left as a more or less cone-shaped pile. Flowability is expressed as the angle of repose, measured by means of a handheld goniometer. The normal range for spray dried powders is from 30 degrees or less ("good") to 45 degrees or more ("poor"). (Reference is made to Cheremisinoff, N., Hydrodynamics of Gas-Solids Fluidization, (1984), p. 6.)

Caking properties are estimated by examining the crust formed on a spoonful powder, subjected to 60% and 80% relative humidity, respectively at 20° C. 24 hours.

|  | Experiment | |
|---|---|---|
|  | 1<br>Spray<br>dryer | 2<br>Flash<br>Evaporator |
| Product | SMP | SMP |
| Liquid product kg/h | 260 | 260 |
| Total solids in liquid product | 50 | 50 |
| Temperature of liquid product ° C. | 55 | 55 |
| Pressure in flash chamber Bar |  | 0.12 |
| Temperature of recirculated product ° C. |  | 50 |
| Total solids in concentrate (8) | — | 62 |
| Flow to spray dryer kg/h | 260 | — |
| Flow to mixing vessel kg/h | — | 209 |
| Drying air temperature inlet/outlet | 200/74 | 170/50 |
| Moisture in dry powder (IDF 21, 1962) | 3.85 | 3.56 |
| Bulk density untapped g/cm³ (DIN 53194) | 0.54 | 0.71 |
| Bulk density tapped g/cm³ (DIN 53194) | 0.69 | 0.85 |
| Particle size d¹ (RRB) μm | 95 | 442 |
| Solubility index (ADMI) | 0.1 | 0.1 |
| Dispersibility | 92.1 | 89.9 |
| Scorched Particles (ADMI) | A | A |

-continued

| | Experiment | |
|---|---|---|
| | 1<br>Spray<br>dryer | 2<br>Flash<br>Evaporator |
| Flowability (Cheremisinoff) | "poor" | ""good" |
| Whey Nitrogen index mgN/g | 4 | 4 |
| Caking-properties | "caking" | "on-caking" |

From the data above, it appears that a free-flowing, non-caking skimmed milk powder (SMP) is obtained having a high bulk density.

Furthermore, the energy efficiency is indicated by the use of less drying air, when producing the powdery product according to the invention.

What is claimed is:

1. A method for producing a powdery product from a protein-containing liquid having a dry solid content, comprising the steps of
   providing a first feeding stream of protein-containing liquid,
   providing a second feeding stream having a higher content of dry solids than said first feeding stream,
   mixing said first feeding stream and said second feeding stream to obtain a main stream,
   heating the main stream in a heater,
   transferring the heated main stream to a separator,
   flash separating volatile components from said heated main stream to obtain a main stream protein-containing concentrate, and
   subjecting at least a part of the mainstream protein-containing concentrate to a drying step thereby obtaining a powdery product.

2. The method according to claim 1, wherein the drying step is performed in a spin flash dryer.

3. The method according to claim 1, wherein the ratio of the first feeding stream rate to the second feeding stream rate as measured in kg/hour is at most 1:2.

4. The method according to claim 1, wherein at least a part of the main stream protein-containing concentrate is recycled to the second feeding stream.

5. The method according to claim 1, wherein the main stream protein-containing concentrate is divided into a recycling stream and a drying stream.

6. The method according to claim 5, wherein the recycling stream is used as the second feeding stream.

7. The method according to claim 1, wherein the protein content of the protein-containing liquid is at least 3% of total dry solids.

8. The method according to claim 1, wherein lactose constitutes at most 55%, of the dry solids of the protein-containing liquid.

9. The method according to claim 1, wherein the protein-containing liquid comprises fat.

10. The method according to claim 1, wherein the fat content is at least 0.5% of dry solids.

11. The method according to claim 1, wherein the protein-containing liquid comprises at least 20 percent of dries solids.

12. The method according to claim 1, wherein the protein-containing liquid is selected from the group consisting of skimmed milk, whole milk, butter milk, milk protein concentrate, Na-casein ate, Ca-casein ate, vegetable protein, vegetable protein isolate, soy protein, delactosed whey, cream, butter, shortening, coconut milk, egg, egg white, blood, and malted milk.

13. The method according to claim 1, wherein the heater is a heat exchanger.

14. The method according to claim 1, wherein the heater is an ohmic heater.

15. The method according to claim 1, wherein protein-containing liquid is heated up to a temperature below the coagulation temperature of the proteins of the liquid.

16. The method according to claim 15, wherein the temperature is from 30° C. to 100° C.

17. The method according to claim 1, wherein the protein-containing liquid temperature in the separator is in the range from 25° C. to 95° C.

18. The method according to claim 1, wherein the pressure in the separator is in the range of 0.05–0.9 bar.

19. The method according to claim 1, wherein the protein-containing concentrate comprises at least 25 percent of dry solids.

20. The method according to claim 1, wherein the recycling stream comprises at least 80% of the dry solids of the mainstream protein-containing concentrate.

21. The method according to claim 20, comprising continuous recirculation of the protein-containing concentrate.

22. The method according to claim 1, wherein at least a part of the main stream protein-containing concentrate is a feeding stream to be subjected to a second heating step in a second heater, and a second separating step obtaining a second main stream protein-containing concentrate.

23. The method according to claim 22, wherein at least a part of the second main stream protein-containing concentrate is subjected to a drying step.

24. The method according to claim 1, wherein at least a part of the main stream protein-containing concentrate is mixed with a secondary stream before being subjected to the drying step.

25. The method according to claim 24, wherein the secondary stream comprises vitamins, proteins, fats and/or carbohydrates.

26. The method according to claim 5, wherein the drying stream is cooled prior to the drying step.

* * * * *